(12) United States Patent
Nakayasu

(10) Patent No.: US 7,061,889 B2
(45) Date of Patent: Jun. 13, 2006

(54) SYSTEM FOR MONITORING CDMA-TYPE MOBILE TERMINAL AND METHOD OF DOING THE SAME

(75) Inventor: Kanada Nakayasu, Tokyo (JP)

(73) Assignee: NEC Corporation, Tokyo (JP)

( * ) Notice: Subject to any disclaimer, the term of this patent is extended or adjusted under 35 U.S.C. 154(b) by 891 days.

(21) Appl. No.: 09/866,796

(22) Filed: May 30, 2001

(65) Prior Publication Data

US 2001/0048666 A1 Dec. 6, 2001

(30) Foreign Application Priority Data

May 30, 2000 (JP) .............................. 2000-160684

(51) Int. Cl.
*H04B 7/216* (2006.01)
(52) U.S. Cl. ...................................... 370/335; 370/401
(58) Field of Classification Search ................ 370/335, 370/342, 401; 455/433, 435.1, 435.2, 435.3
See application file for complete search history.

(56) References Cited

U.S. PATENT DOCUMENTS

| | | | |
|---|---|---|---|
| 5,297,193 A | | 3/1994 | Bouix et al. |
| 5,819,177 A | | 10/1998 | Vucetic et al. |
| 5,933,777 A | * | 8/1999 | Rahman ...................... 455/450 |
| 6,009,321 A | * | 12/1999 | Wang et al. ................. 455/410 |
| 6,078,817 A | * | 6/2000 | Rahman ................... 455/452.1 |
| 6,137,791 A | * | 10/2000 | Frid et al. .................... 370/352 |
| 6,321,096 B1 | * | 11/2001 | Lautenschlager et al. ... 455/461 |
| 6,360,095 B1 | * | 3/2002 | Cunningham et al. ...... 455/433 |
| 6,718,173 B1 | * | 4/2004 | Somani et al. ........... 455/456.1 |

FOREIGN PATENT DOCUMENTS

| | | |
|---|---|---|
| CN | 1219330 A | 6/1999 |
| GB | 2 316 275 A | 2/1998 |
| JP | 4-51797 | 2/1992 |
| JP | 5-336108 | 12/1993 |
| JP | 9-8724 | 1/1997 |
| JP | 10-341197 | 12/1998 |
| JP | 11-331923 | 11/1999 |
| JP | 2000-23230 | 1/2000 |
| JP | 2000-32560 | 1/2000 |
| JP | 2000-91982 | 3/2000 |
| KR | 1999-0058864 | 7/1999 |
| KR | 1999-0079284 | 11/1999 |
| WO | WO 99/44381 A1 | 9/1999 |
| WO | WO 00/07398 | 2/2000 |
| WO | WO 00/07398 A1 | 2/2000 |

\* cited by examiner

*Primary Examiner*—Ricky Q. Ngo
*Assistant Examiner*—Christine Ng
(74) *Attorney, Agent, or Firm*—Foley & Lardner LLP

(57) ABSTRACT

A system for monitoring a CDMA-type mobile terminal device, includes (a) a CDMA base station system, (b) a CDMA core network connected to the CDMA base station system through wires, (c) a server which monitors the CDMA base station system connected to the CDMA core network through wires, (d) a monitoring device connected to the server through wires, the monitoring device monitoring and controlling the CDMA base station system through both the server and the CDMA core network, and (e) a CDMA-type mobile terminal device connected to the CDMA base station system through radio signals.

12 Claims, 3 Drawing Sheets

SYSTEM FOR MONITORING CDMA-TYPE MOBILE TERMINAL AND METHOD OF DOING THE SAME

BACKGROUND OF THE INVENTION

1. Field of the Invention

The invention relates to a system for monitoring a CDMA-type mobile terminal device and a method of doing the same, and more particularly to such a system and a method both suitable for a test of moving a CDMA-type mobile terminal device.

2. Description of the Related Art

A CDMA base station system has been conventionally optimized through a test in which a CDMA-type mobile terminal device is moved here and there. When an operator wishes to vary radio environment around the CDMA base station system and/or confirm status of the CDMA base station and a CDMA base station controller while the test is being conducted, he/she has to interrupt the test, and adjust a device for monitoring the CDMA base station system.

If the operator interrupts the test, it is unavoidable that an efficiency of the test is deteriorated and that the test would take further time.

Japanese Unexamined Patent Publication No. 9-8724 has suggested a line tester for testing mobile communication between a base station and a mobile station. The base station includes a first caller which makes a call to the mobile station, a first detector which checks whether the mobile station is connected to a line through the call, and a first transmitter which transmits data to the mobile station. The mobile station includes a first connector which receives a call from the first caller, a first checker which checks whether data transmitted from the first transmitter is properly received, and a second transmitter which transmits a result of check conducted by the first checker, to the base station. The base station receives the result of check from the second transmitter, and records the result therein.

Japanese Unexamined Patent Publication No. 10-341197 has suggested a cellular phone employed in a communication system including a plurality of cellular phones and a plurality of base stations. The cellular phone is comprised of a controller such as CPU, a memory controlled by the controller, a serial interface which makes communication with an external maintenance tool, a signal transmitter and receiver which transmits radio signals to the base station and receives radio signals from the base station, a user interface through which a user inputs data into the cellular phone, and a display unit for displaying data to a user. The cellular phone is connected to the maintenance tool through a wire, and modes are switched in the cellular phone in accordance with commands transmitted from the maintenance tool.

Japanese Unexamined Patent Publication No. 11-331923 has suggested a failure diagnosis system for diagnosing a movable communication terminal, including a failure diagnosis controller which receives a request of diagnosing a mobile communication terminal, conducts a requested diagnosis test, identifies which part is in failure, and informs a failure to a requester, a failure diagnosis test table which receives a request of diagnosing a mobile communication terminal, conducts a diagnosis test, identifies which part is in failure, and informs the failure to a requester, and a failure diagnosis system controller which receives instructions of conducting a diagnosis test from the failure diagnosis controller and the failure diagnosis test table, and controls a test to be conducted for the mobile communication terminal, through an interface to be used for a test.

SUMMARY OF THE INVENTION

In view of the above-mentioned problem in the conventional CDMA base station system, it is an object of the present invention to provide a system for monitoring a CDMA-type terminal device which system is not necessary to interrupt the test even when conditions of the test are to be varied, and hence, is capable of conducting the test with high efficiency and shortening a period of time necessary for completing the test.

In one aspect of the present invention, there is provided a system for monitoring a CDMA-type mobile terminal device, including (a) a CDMA base station system connected to the CDMA-type mobile terminal device through CDMA radio signals, (b) a network connected to the CDMA base station system through wires, and (c) a monitoring device which is connected to the network and which monitors the CDMA-type mobile terminal device, the monitoring device receiving an access from the CDMA-type mobile terminal device through both the CDMA base station system and the network.

It is preferable that when the CDMA base station system receives a first request to connect thereto from the CDMA-type mobile terminal device, the CDMA base station system checks whether the CDMA-type mobile terminal device is registered in the CDMA base station system.

It is preferable that when the network receives a second request to connect thereto from the CDMA base station system, the network checks whether the CDMA-type mobile terminal device transmitting the first request is registered in the network.

It is preferable that when the CDMA base station system confirms that the CDMA-type mobile terminal device is registered in the CDMA base station system and the network confirms that the CDMA-type mobile terminal device is registered in the network, a radio interface is established between the CDMA-type mobile terminal device and the CDMA base station system and a wire interface is established between the CDMA base station system and the monitoring device.

It is preferable that the CDMA-type mobile terminal device transmits a non-ordinary call to the CDMA base station system as the first request.

There is further provided a system for monitoring a CDMA-type mobile terminal device, including (a) a CDMA base station system, (b) a CDMA core network connected to the CDMA base station system through wires, (c) a server which monitors the CDMA base station system connected to the CDMA core network through wires, (d) a monitoring device connected to the server through wires, the monitoring device monitoring and controlling the CDMA base station system through both the server and the CDMA core network, and (e) a CDMA-type mobile terminal device connected to the CDMA base station system through radio signals.

The system may further include a terminal connected to the CDMA-type mobile terminal device for controlling an operation of the monitoring device.

In another aspect of the present invention, there is provided a method of monitoring a CDMA-type mobile terminal device in a system including a CDMA base station system connected to the CDMA-type mobile terminal device through CDMA radio signals, a network connected to the CDMA base station system through wires, and a monitoring device which is connected to the network and which monitors the CDMA-type mobile terminal device, the method including the step of receiving an access from the CDMA-type mobile terminal device through both the CDMA base station system and the network, the step being carried out by the monitoring device.

The method may further include the step of, on receipt of a first request to connect to the CDMA base station system, from the CDMA-type mobile terminal device, checking whether the CDMA-type mobile terminal device is registered in the CDMA base station system, the step being carried out by the CDMA base station system.

The method may further include the step of on receipt of a second request to connect to the network, from the CDMA base station system, checking whether the CDMA-type mobile terminal device transmitting the first request is registered in the network, the step being carried out by the network.

The method may further include the step of, when the CDMA base station system confirms that the CDMA-type mobile terminal device is registered in the CDMA base station system and the network confirms that the CDMA-type mobile terminal device is registered in the network, establishing a radio interface between the CDMA-type mobile terminal device and the CDMA base station system and a wire interface between the CDMA base station system and the monitoring device.

It is preferable that the CDMA-type mobile terminal device transmits a non-ordinary call to the CDMA base station system as the first request.

There is further provided a method of monitoring a CDMA-type mobile terminal device in a system including a CDMA base station system connected to the CDMA-type mobile terminal device through CDMA radio signals, a network connected to the CDMA base station system through wires, a server connected to the network, and a monitoring device which is connected to the server and which monitors the CDMA-type mobile terminal device, the method including the steps of (a) transmitting a first request to connect to the CDMA base station system, the step (a) being carried out by the CDMA-type mobile terminal device, (b) checking whether the CDMA-type mobile terminal device is in advance registered in the CDMA base station system, the step (b) being carried out by the CDMA base station system, (c) transmitting a second request to connect to the network, the step (c) being carried out by the CDMA base station system, (d) checking whether the CDMA-type mobile terminal device is in advance registered in the network, the step (d) being carried out by the network, (e) establishing a radio interface between the CDMA base station system and the CDMA-type mobile terminal device, the step (e) being carried out by the CDMA base station system, (f) establishing a wire interface between the CDMA base station system and the server, the step (f) being carried out by the CDMA base station system, and (g) connecting the CDMA-type mobile terminal device to the monitoring device, the step (g) being carried out by the server.

There is still further provided a method of monitoring a CDMA-type mobile terminal device in a system including a CDMA base station system connected to the CDMA-type mobile terminal device through CDMA radio signals, a network connected to the CDMA base station system through wires, a server connected to the network, and a monitoring device which is connected to the server and which monitors the CDMA-type mobile terminal device, the method including the steps of (a) transmitting a first request to connect to the CDMA-type mobile terminal device as a trial, the step (a) being carried out by the server, (b) transmitting a second request to connect to the CDMA base station system, the step (b) being carried out by the CDMA-type mobile terminal device, (c) checking whether the CDMA-type mobile terminal device is in advance registered in the CDMA base station system, the step (c) being carried out by the CDMA base station system, (d) transmitting a third request to connect to the network, the step (d) being carried out by the CDMA base station system, (e) checking whether the CDMA-type mobile terminal device is in advance registered in the network, the step (e) being carried out by the network, (f) establishing a radio interface between the CDMA base station system and the CDMA-type mobile terminal device, the step (f) being carried out by the CDMA base station system, (g) establishing a wire interface between the CDMA base station system and the server, the step (g) being carried out by the CDMA base station system, and (h) connecting the CDMA-type mobile terminal device to the monitoring device, the step (h) being carried out by the server.

The advantages obtained by the aforementioned present invention will be described hereinbelow.

In accordance with the present invention, an access can be made to the monitoring device from the CDMA-type mobile terminal device even while the test is being conducted, and radio environment around the CDMA-type mobile terminal device can be varied, and/or status of an operation of the CDMA-type mobile terminal device can be confirmed through, for instance, a terminal device connected to the CDMA-type mobile terminal device, without interrupting the test. Hence, it is now possible to conduct the test with high efficiency, and further possible to shorten a period of time necessary for conducting the test.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

Figure 1:
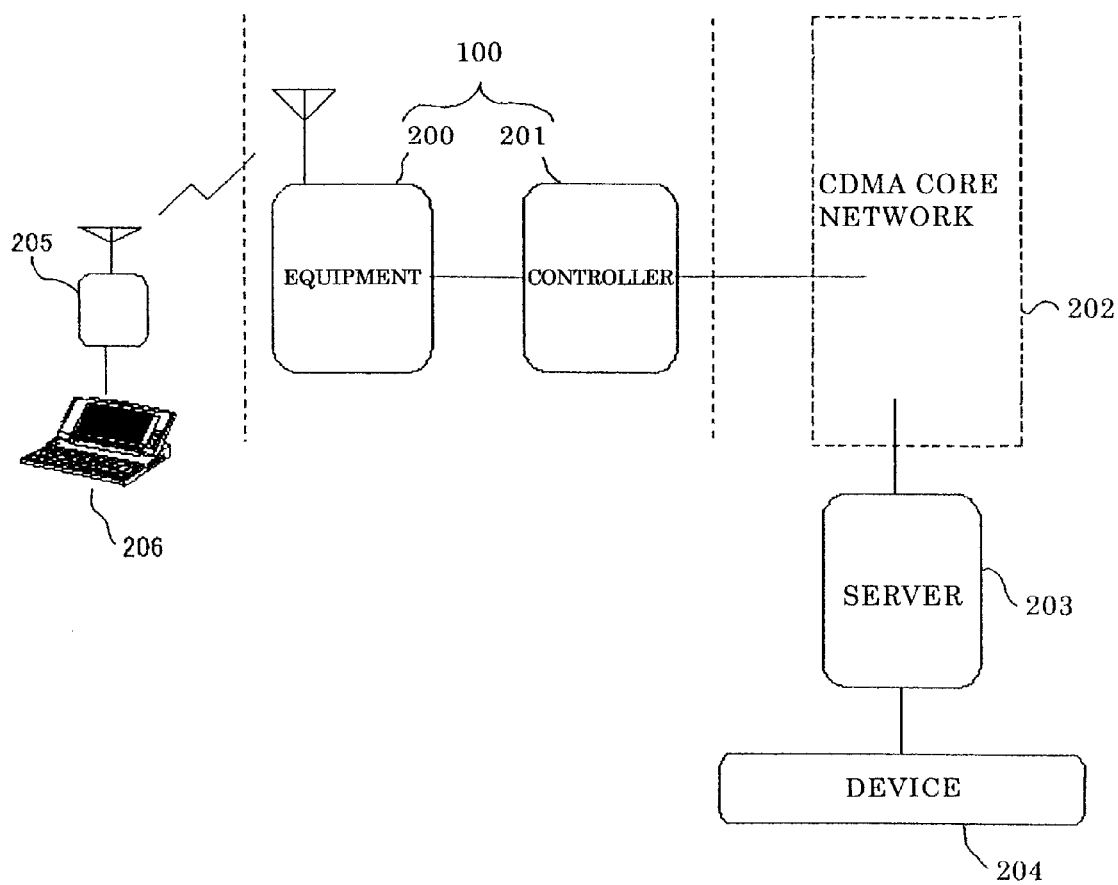
FIG. 1 is a block diagram of a system for monitoring a CDMA-type mobile terminal device, in accordance with the first embodiment of the present invention.

FIG. 1 is a block diagram of a system for monitoring CDMA-type mobile terminal device, in accordance with the first embodiment.

The system is comprised of a CDMA radio base station system 100, a CDMA core network 202, a server 203 for monitoring the CDMA base station system 100, a device 204 for monitoring the CDMA base station system 100, a CDMA-type mobile terminal device 205 to be tested, and a personal computer terminal 206 connected to the CDMA-type mobile terminal device 205 as a local monitoring device.

The CDMA radio base station system 100 is comprised of a CDMA radio base station equipment 200 and a CDMA radio base station controller 201.

The CDMA-type mobile terminal device 205 is connected to the CDMA radio base station equipment 200 through CDMA radio interface. The CDMA radio base station equipment 200 and the CDMA radio base station controller 201 are connected to each other through wires or radios. The CDMA radio base station controller 201 is connected to the CDMA core network 202 through wires. The CDMA core network 202 is connected to the server 203 through wires. The server 203 is connected to the device 204 through wires.

The CDMA radio base station equipment 200 is designed to have functions of terminating CDMA radio interface, modulating and demodulating radio areas, controlling transmission of electric power, and coding and decoding error correction signals for correcting errors in transmitted and received signals.

The CDMA radio base station controller 201 is designed to have functions of certifying the CDMA-type mobile terminal device 205 in CDMA radio interface, controlling a call, assigning and administrating extension codes, administrating hand-over, administrating interfere and traffic in a sector, and controlling making and receiving calls.

The CDMA core network 202 is designed to have functions of exchanging ATM or IP, administrating and controlling a location of the CDMA-type mobile terminal device 205, certifying the CDMA-type mobile terminal device 205, and controlling making and receiving calls.

The server 203 acts as a TCP/IP server to the CDMA radio base station system 100, and logically connected to both the CDMA radio base station equipment 200 and the CDMA radio base station controller 201.

The device 204 monitors and controls the CDMA radio base station equipment 200 and the CDMA radio base station controller 201 through the server 203. The device 204 is designed to have functions of monitoring an operation of the CDMA radio base station system 100, controlling transmission of electric power to peripheral radio interfaces, and controlling making a call.

Figure 2:
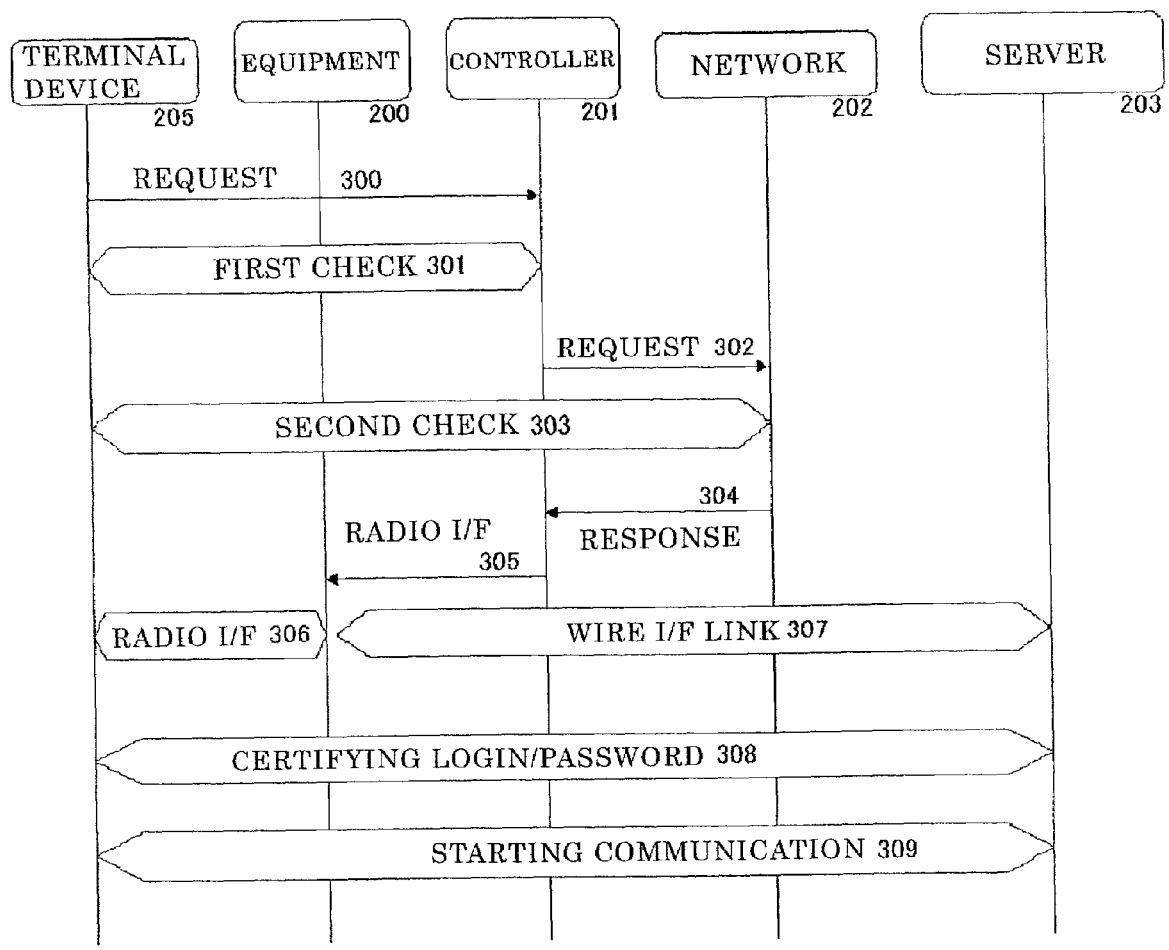
FIG. 2 is a sequence chart showing an operation of the system illustrated in FIG. 1.

FIG. 2 is a sequence chart showing an operation of the system illustrated in FIG. 1. Hereinbelow is explained an operation of the system.

First, the CDMA-type mobile terminal device 205 transmits a request to the CDMA radio base station equipment 201 to connect to the CDMA radio base station equipment 201, in step 300. This request is comprised of a non-ordinary call in order to distinguish the request from ordinary calls transmitted from the CDMA-type mobile terminal device 205.

On receipt of the request transmitted from the CDMA-type mobile terminal device 205, the CDMA radio base station controller 201 carries out a first check as to whether the CDMA-type mobile terminal device 205 is registered in the CDMA radio base station controller 201, in step 301.

The device 204 in advance registers CDMA-type mobile terminal devices in the CDMA radio base station controller 201. If the CDMA-type mobile terminal device 205 is not registered in the CDMA radio base station controller 201, the CDMA radio base station controller 201 rejects the request transmitted from the CDMA-type mobile terminal device 205.

If the CDMA radio base station controller 201 confirms that the CDMA-type mobile terminal device 205 is registered in the CDMA radio base station controller 201, the CDMA radio base station controller 201 transmits a request to the CDMA core network 202 to connect to the CDMA core network 202, in step 302.

On receipt of the request transmitted from the CDMA radio base station controller 201, the CDMA core network 202 carries out a second check as to whether the CDMA-type mobile terminal device 205 is registered in the CDMA core network 202, in step 303.

If the CDMA core network 202 confirms that the CDMA-type mobile terminal device 205 is registered in the CDMA core network 202, the CDMA core network 202 transmits a request to the CDMA radio base station controller 201 to connect to the CDMA radio base station controller 201, in step 304.

On receipt of the request transmitted from the CDMA core network 202, the CDMA radio base station controller 201 instructs the CDMA radio base station equipment 200 to establish a wire interface between the CDMA radio base station equipment 200 and the CDMA-type mobile terminal device 205, in step 305.

In accordance with the instruction received from the CDMA radio base station controller 201, the CDMA radio base station equipment 200 establishes a wire interface between the CDMA radio base station equipment 200 and the CDMA-type mobile terminal device 205, in step 306, and further establishes a wire interface link between the CDMA radio base station equipment 200 and the server 203, in step 307.

Then, the server 203 checks Login/password transmitted from the CDMA-type mobile terminal device 205, in step 308. If the Login/password is proper one, the server 203 starts making communication with the CDMA-type mobile terminal device 205, in step 309. Thus, the CDMA-type mobile terminal device 205 is connected to the device 204.

Since the CDMA-type mobile terminal device 205 and the device 204 are now connected to each other, an operator of the system can control the device 204 through the personal computer terminal 206 connected to the CDMA-type mobile terminal device 205. As a result, it is possible to monitor an operation of the CDMA radio base station system 100, control transmission of electric power to peripheral wire interfaces, and restricts making calls.

In accordance with the above-mentioned system of the first embodiment, even when an operator of the system intends to vary environmental radio circumference or confirm an operation of the CDMA radio base station equipment 200 and the CDMA radio base station controller 201 while a test is being conducted, the operator can do so making access directly to the server through the personal computer terminal 206 connected to the CDMA-type mobile terminal device 205. Hence, it is possible to conduct the test with high efficiency without interrupting the test, and further possible to shorten a period of time necessary for conducting the test.

Figure 3:
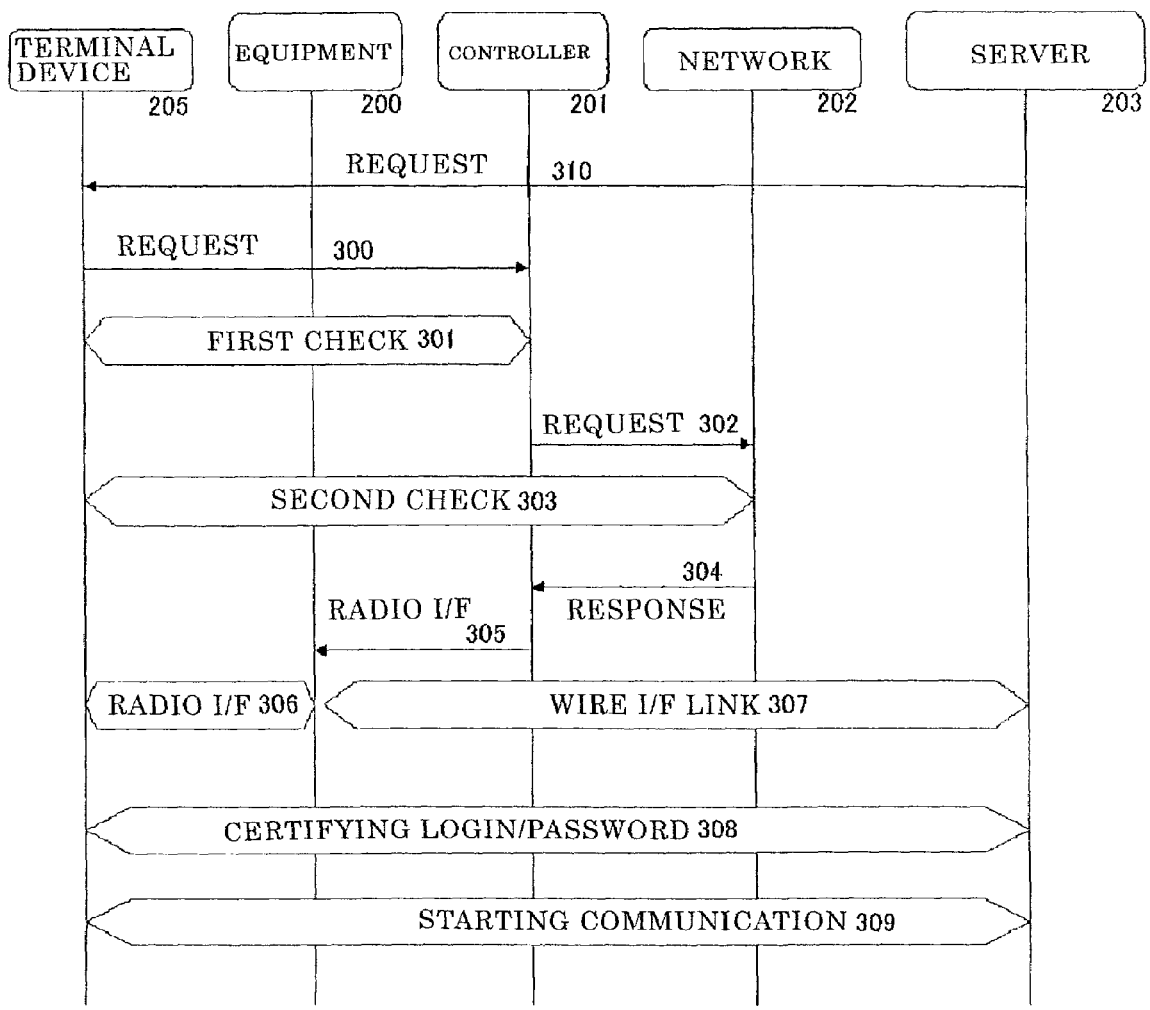
FIG. 3 is a sequence chart showing an operation of a system for monitoring CDMA-type mobile terminal device, in accordance with the second embodiment of the present invention.

FIG. 3 is a sequence chart showing an operation of a system for monitoring a CDMA-type mobile terminal device, in accordance with the second embodiment. The system in accordance with the second embodiment has the same structure as the system in accordance with the first embodiment, but operates in a different manner from the first embodiment. Hereinbelow is explained an operation of the system in accordance with the second embodiment.

In the above-mentioned first embodiment, data about the CDMA-type mobile terminal device 205 is in advance stored in both the CDMA radio base station controller 201 and the CDMA core network 202, and the CDMA radio base station controller 201, on receipt of a request of connecting thereto, transmitted from the CDMA-type mobile terminal device 205, makes an access to the server 203.

In contrast, in accordance with the second embodiment, the server 203 first transmits a request to the CDMA-type mobile terminal device 205 to connect to the CDMA-type mobile terminal device 205, in step 310.

Thereafter, the CDMA radio base station controller 201 receives a request from the CDMA-type mobile terminal device 205 to connect to the CDMA radio base station controller 201, in step 300. Then, steps 301 to 309 are carried out in the same way as the first embodiment.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2000-160684 filed on May 30, 2000 including specification, claims, drawings and summary is incorporated herein by reference in its entirety.

What is claimed is:

1. A system for monitoring and controlling a CDMA mobile communication system, comprising:
   (a) a CDMA base station connected to a CDMA mobile terminal device through CDMA radio signals;
   (b) a network connected to said CDMA base station through wires; and
   (c) a monitoring device which monitors and controls said CDMA mobile communications system, said monitoring device receiving an access from said CDMA mobile terminal device through both said CDMA base station and said network; and
   (d) a server connected to said monitoring device and that provides for communication between said monitoring device and said network,
   wherein when said CDMA base station receives a first request to connect thereto from said CDMA mobile terminal device, said CDMA base station checks whether said CDMA mobile terminal device is registered with said CDMA base station,
   wherein when said network receives a second request to connect thereto from said CDMA base station, said network checks whether said CDMA mobile terminal device transmitting said first request is registered with said network,
   wherein when said CDMA base station confirms that said CDMA mobile terminal device is registered with said CDMA base station and said network confirms that said CDMA mobile terminal device is registered with said network, a radio interface is established between said CDMA mobile terminal device and said CDMA base station and a wire interface is established between said CDMA base station and said monitoring device, and
   wherein when a user of a terminal directly connected to said CDMA mobile terminal device enters in correct login and password information that is provided to said server by way of the radio interface that has been established between said CDMA mobile terminal device and said CDMA base station and by way of the wire interface that has been established between said CDMA base station and said monitoring device, said user is provided capability to monitor and control said CDMA mobile communication system by way of said CDMA mobile terminal device.

2. The system as set forth in claim 1, wherein said CDMA mobile terminal device transmits a non-ordinary call to said CDMA base station as said first request.

3. The system as set forth in claim 1, wherein the user of said terminal controls at least one of: a) transmission of electric power to peripheral wire interfaces of said CDMA mobile communication system, and b) call restrictions for said CDMA mobile communication system.

4. A system for monitoring and controlling a CDMA mobile mobile communication system, comprising:
   (a) a CDMA base station;
   (b) a CDMA core network connected to said CDMA base station through wires;
   (c) a server which monitors said CDMA base station connected to said CDMA core network through wires;
   (d) a monitoring device connected to said server through wires, said monitoring device monitoring and controlling said CDMA base station through both said server and said CDMA core network;
   (e) a CDMA mobile terminal device connected to said CDMA base station through radio signals; and
   (f) a terminal directly connected to said CDMA mobile terminal device,
   wherein when said CDMA base station receives a first request to connect thereto from said CDMA mobile terminal device, said CDMA base station checks whether said CDMA mobile terminal device is registered with said CDMA base station,
   wherein when said CDMA core network receives a second request to connect thereto from said CDMA base station, said CDMA core network checks whether said CDMA mobile terminal device transmitting said first request is registered with said network,
   wherein when said CDMA base station confirms that said CDMA mobile terminal device is registered with said CDMA base station and said CDMA core network confirms that said CDMA mobile terminal device is registered with said network, a radio interface is established between said CDMA mobile terminal device and said CDMA base station and a wire interface is established between said CDMA base station and said monitoring device by way of said CDMA core network and said server, and
   wherein when a user of said terminal directly connected to said CDMA mobile terminal device enters in correct login and password information that is provided to said server by way of the radio interface that has been established between said CDMA mobile terminal device and said CDMA base station and by way of the wire interface that has been established between said CDMA base station and said monitoring device, said user is provided capability to monitor and control said CDMA mobile communication system by way of said CDMA mobile terminal device.

5. The system as set forth in claim 4, wherein the user of said terminal controls at least one of: a) transmission of electric power to peripheral wire interfaces of said CDMA mobile communication system, and b) call restrictions for said CDMA mobile communication system.

6. A method of monitoring and controlling a CDMA mobile communication system including a CDMA base station connected to a CDMA mobile terminal device through CDMA radio signals, a network connected to said CDMA base station through wires, and a monitoring device which is connected to said network via a server, said method comprising:

receiving an access from said CDMA mobile terminal device through both said CDMA base station and said network, said step being carried out by said monitoring device;

on receipt of a first request to connect to said CDMA base station, from said CDMA mobile terminal device, checking whether said CDMA mobile terminal device is registered with said CDMA base station, said step being carried out by said CDMA base station;

on receipt of a second request to connect to said network, from said CDMA base station, checking whether said CDMA mobile terminal device transmitting said first request is registered with said network, said step being carried out by said network;

when said CDMA base station confirms that said CDMA mobile terminal device is registered with said CDMA base station and said network confirms that said CDMA mobile terminal device is registered with said network, establishing a radio interface between said CDMA mobile terminal device and said CDMA base station and a wire interface between said CDMA base station and said monitoring device, and wherein, when a user of said terminal directly connected to said CDMA mobile terminal device enters in correct login and password information that is provided to said server by way of the radio interface that has been established between said CDMA mobile terminal device and said CDMA base station and by way of the wire interface that has been established between said CDMA base station and said monitoring device, providing monitoring and control of said CDMA mobile communication system by way of inputs made by said user that are entered at said terminal of said CDMA mobile terminal device.

7. The method as set forth in claim 6, wherein said CDMA mobile terminal device transmits a non-ordinary call to said CDMA base station system as said first request.

8. The method as set forth in claim 6, wherein the user of said terminal controls at least one of: a) transmission of electric power to peripheral wire interfaces of said CDMA mobile communication system, and b) call restrictions for said CDMA mobile communication system.

9. A method of monitoring and controlling a CDMA mobile communication system including a CDMA base station connected to a CDMA mobile terminal device through CDMA radio signals, a network connected to said CDMA base station through wires, a server connected to said network, and a monitoring device which is connected to said server and which monitors said CDMA mobile terminal device, said method comprising the steps of:

(a) transmitting a first request to connect to said CDMA base station, said step (a) being carried out by said CDMA mobile terminal device;

(b) checking whether said CDMA mobile terminal device is in advance registered with said CDMA base station, said step (b) being carried out by said CDMA base station system;

(c) transmitting a second request to connect to said network, said step (c) being carried out by said CDMA base station;

(d) checking whether said CDMA mobile terminal device is in advance registered with said network, said step (d) being carried out by said network;

(e) establishing a radio interface between said CDMA base station and said CDMA mobile terminal device, said step (e) being carried out by said CDMA base station;

(f) establishing a wire interface between said CDMA base station and said server, said step (f) being carried out by said CDMA base station; and (g) connecting said CDMA mobile terminal device to said monitoring device, said step (g) being carried out by said server;

(h) manually entering, by a user using a terminal directly connected with said CDMA mobile terminal device, login and password information;

(i) receiving said login and password information at said server by way of the radio interface that has been established between said CDMA mobile terminal device and said CDMA base station and by way of the wire interface that has been established between said CDMA base station and said server;

(j) determining, at said server, whether or not the login and password information is verified so as to allow the user to perform certain control and monitoring functions at the terminal; and (k) monitoring and controlling said CDMA mobile communication system by way inputs made by said user at said terminal.

10. The method as set forth in claim 9, wherein the user of said terminal controls at least one of: a) transmission of electric power to peripheral wire interfaces of said CDMA mobile communication system, and b) call restrictions for said CDMA mobile communication system.

11. A method of monitoring and controlling a CDMA mobile terminal device in a CDMA mobile communication system including a CDMA base station connected to said CDMA mobile terminal device through CDMA radio signals, a network connected to said CDMA base station through wires, a server connected to said network, and a monitoring device which is connected to said server and which monitors said CDMA mobile terminal device, said method comprising the steps of:

(a) transmitting a first request to connect to said CDMA mobile terminal device as a trial, said step (a) being carried out by said server;

(b) transmitting a second request to connect to said CDMA base station, said step (b) being carried out by said CDMA mobile terminal device;

(c) checking whether said CDMA mobile terminal device is in advance registered in said CDMA base station, said step (c) being carried out by said CDMA base station;

(d) transmitting a third request to connect to said network, said step (d) being carried out by said CDMA base station;

(e) checking whether said CDMA mobile terminal device is in advance registered in said network, said step (e) being carried out by said network;

(f) establishing a radio interface between said CDMA base station and said CDMA mobile terminal device, said step (f) being carried out by said CDMA base station;

(g) establishing a wire interface between said CDMA base station and said server, said step (g) being carried out by said CDMA base station; and
(h) connecting said CDMA mobile terminal device to said monitoring device, said step (h) being carried out by said server;
(i) manually entering, by a user using a terminal directly connected with said CDMA mobile terminal device, login and password information;
(j) receiving said login and password information at said server by way of the radio interface that has been established between said CDMA mobile terminal device and said CDMA base station and by way of the wire interface that has been established between said CDMA base station and said server;
(k) determining, at said server, whether or not the login and password information is verified so as to allow the user to perform certain control and monitoring functions at the terminal; and
(l) monitoring and controlling said CDMA mobile communication system by way inputs made by said user at said terminal.

12. The method as set forth in claim 11, wherein the user of said terminal controls at least one of: a) transmission of electric power to peripheral wire interfaces of said CDMA mobile communication system, and b) call restrictions for said CDMA mobile communication system.

* * * * *